Nov. 3, 1959    R. B. PETTIBONE    2,910,944
POWER TRANSMISSION
Filed Sept. 6, 1955
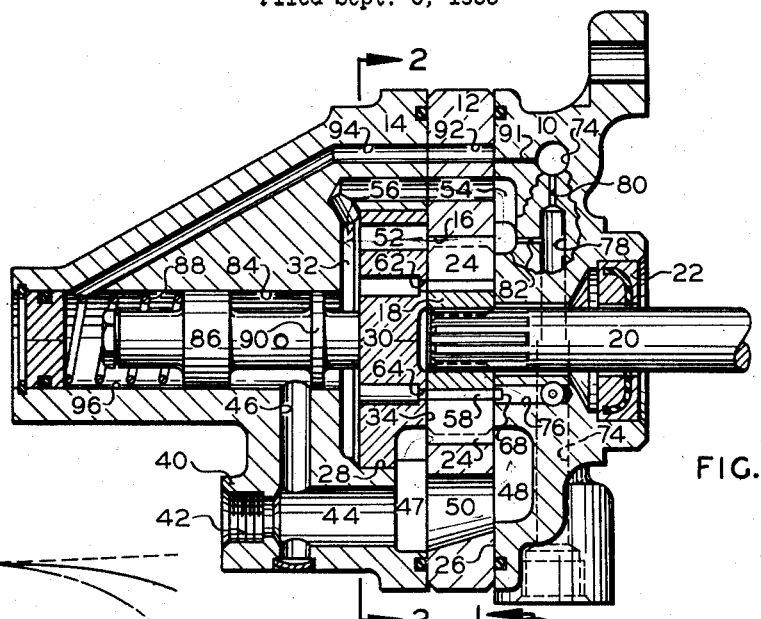
FIG. 1
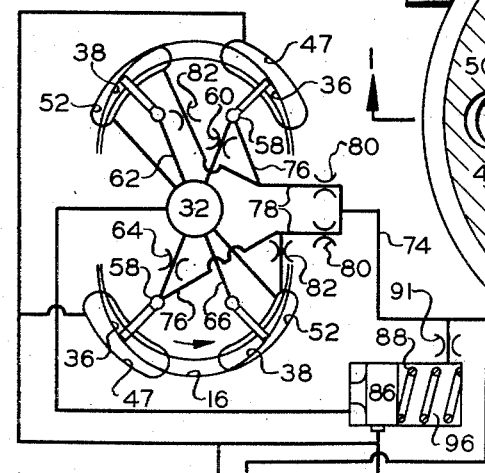
FIG. 3
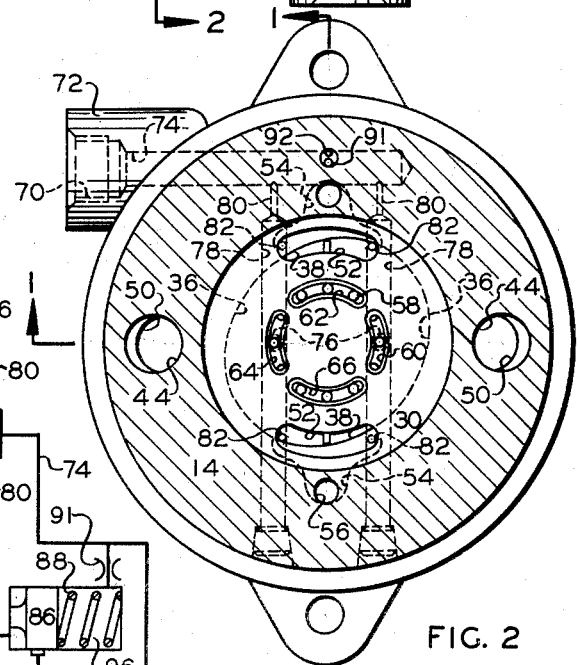
FIG. 2
FIG. 4
INVENTOR.
RAYMOND B. PETTIBONE
BY
ATTORNEY

United States Patent Office 2,910,944
Patented Nov. 3, 1959

2,910,944

POWER TRANSMISSION

Raymond B. Pettibone, Detroit, Mich., assignor to Vickers Incorporated, Detroit, Mich., a corporation of Michigan Application September 6, 1955, Serial No. 532,522

7 Claims. (Cl. 103—42)

This invention relates to power transmissions, and is particularly applicable to those of the type comprising two or more fluid pressure energy translating devices, one of which may function as a pump and another as a fluid motor.

More particularly the invention relates to a flow control system for such a transmission in which the pump is driven by a variable speed prime mover, such as the engine of a motor vehicle.

In such transmissions, the fluid actuated accessories often require as high a rate of fluid supply during engine idle periods as during high speed engine operation. For example, this is true in the case of a steering booster. Thus, where a constant displacement pump directly driven from the vehicle engine is utilized, the pump discharge flow rate at engine idle must be sufficiently high for satisfactory accessory operation. As engine speed increases, so also does the discharge rate of the pumping mechanism. In the usual motor vehicle, the ratio of engine idle speed to top speed is approximately one to ten. Thus, there is an over-supply of fluid at all times when engine speeds are substantially above idle. Where precise control is required, as in steering, this variable over-supply presents a serious problem.

The prior art has attacked the problem of fluid oversupply to the load by providing spill-over, or by-pass, type flow controls in the system. The usual arrangement has a by-pass valve at the pump outlet which is spring biased to a closed position in which all fluid pumped goes to the load. A restriction to fluid flow in the motor line creates a pressure differential which is proportional to the flow rate to the work and this differential is utilized to control the by-pass valve. When flow to the work reaches a certain desired magnitude, the pressure differential overcomes the valve spring and causes the by-pass valve to shift and thus divert pumped fluid away from the work and back to the reservoir. When the cracking point of the by-pass valve has been reached, further increases in pumping rate result in greater opening of the valve and increased flow of by-pass fluid. Such a spill-over type valve is shown in Figure 1 of the patent to Amsler, No. 1,467,522.

The above described arrangement has been quite satisfactory but has one important disadvantage. This disadvantage results largely from the rate characteristics of the biasing springs used in the by-pass valve and the velocity effect of the by-passed fluid on the valve spool. Due to the spring rate and velocity effect, an increasing pressure differential is required to move the by-pass valve from the cracking position to the wide open position. Since the valve actuating pressure differential is proportional to flow rate to the work, flow rate to the work must increase as the valve moves from cracking to wide open. The consequent increase in flow rate to the work resulting from variations in pump speed above the valve cracking point is of substantial magnitude and has been found detrimental to precise control in such applications as steering systems.

Further, extremely high pump speeds are normally associated with high vehicle speeds. Since at high vehicle speeds the rate of maneuvering is of necessity limited, a high rate of supply to the steering booster is not required. If the high or increasing supply rate is continued, it results in waste of power and excessive heating of the oil. Thus, power can be conserved and operating temperatures reduced by slightly lowering the flow rate to the booster during high speed vehicle operation.

In my copending application, Serial Number 505,958, now U.S. Patent No. 2,782,718, I have disclosed a system which provides low cost, fluid flow rate control for delivering a substantially constant flow rate to a load from a variable flow rate source throughout a wide range of operating speeds.

In the practice of the invention described in the hereinbefore identified application, it has at times been found difficult to obtain with the desired exactitude a particular flow-rate-to-work versus pump-speed curve. For example, in some cases if an early droop to the curve is desired, and obtained, the curve may fall off too rapidly at the outer end of the speed range.

It is, therefore, an object of this invention to provide an improved flow rate control system having the advantages of my prior system, described in the hereinbefore identified copending application, but in which the flow-rate versus pump-speed curve characteristic is more desirable for certain applications.

It is also an object of this invention to provide such a system incorporated in low cost pumping structure.

Further objects and advantages of the present invention will be apparent from the following description, reference being had to the accompanying drawing wherein a preferred form of the present invention is clearly shown.

In the drawing:

Figure 1 is a longitudinal cross-sectional view of pumping structure incorporating the present invention, taken on line 1—1 of Figure 2.

Figure 2 is a sectional view taken on line 2—2 of Figure 1.

Figure 3 is a schematic diagram illustrating the present invention.

Figure 4 compares actual performance curves of a pump and flow control valve embodying the present invention, the invention of my copending application, Serial Number 505,958, and a conventional pump and flow control valve.

Referring now to Figure 1, there is shown pumping structure of the general type described in the patent to Gardiner et al., No. 2,544,988. The pumping structure includes a body member 10, a ring 12, and a head 14. The ring 12 has an elliptically shaped chamber 16 in which a rotor 18 is telescopically disposed. Rotor 18 is supported on and driven by a drive shaft 20 which is rotatably carried on bearings in a mounting pad, not shown. The usual shaft seal 22 is provided to prevent leakage from the body 10 at the point of emergence therefrom of the shaft 20. Rotor 18 has a plurality of radial slots therein, each of which carries a vane 24. The vanes 24 extend from rotor 18 to abut the elliptical track 16 in ring 12. Rotor 18, ring 12, and vanes 24 are axially abutted at one side by a plane face 26 of the body member 10.

The head 14 includes a recess 28 in which is positioned a pressure plate 30. The periphery of pressure plate 30 engages the chamber 28 in a fluid sealing relation therewith to form a pressure chamber 32. Fluid pressure in chamber 32 biases pressure plate 30 rightwardly and urges the plane face 34 of pressure plate 30 into axial abutment with ring 12, rotor 18, and vanes 24. When the rotor 18 is driven by shaft 20, the outer ends of the vanes 24 will follow the cam track 16. The intervane working chamber between each pair of adjacent vanes will undergo alternate expansion and contraction due to outward and inward movement of the vanes, induced by track 16. Because of the multi-throw, elliptical shape of the pumping chamber, each working chamber will expand and contract twice in each revolution. Each intervane working chamber bounded by a vane moving along one of the inlet ramps 36 will be increasing in size, and each of the intervane working chambers bounded by a vane moving along one of the discharge ramps 38 will be decreasing in size. The pumping structure thus far described is similar in nature to that in the Gardiner et al. patent. A more detailed description may be obtained by reference to that patent.

A boss 40 is provided on the head member 14 and has a return or inlet connection port 42 therein. Return port 42 communicates directly with a return passage 44 and through a cross drilled passage 46 with a second return passage designated 44 and located in a diametrically opposed position. The expanding intervane chambers adjacent each of the inlet ramps are supplied with fluid by a pair of inlet ports 47 and 48 which are connected by a passage 50 extending through ring 12. Only one pair of these ports is illustrated in Figure 1. Ports 47 and 48 communicate with the return port 42 through the return passages 44.

The contracting intervane spaces traversing the discharge ramps 38 eject pressure fluid from both sides of the rotor 18 into ports 52, which extend directly through the pressure plate 30 to communicate with the pressure chamber 32, and also into a pair of pocket ports 54 in body 10 which communicate with the pressure chamber 32 through the passages 56 extending through ring 12 and head 14.

The clearance space between the inner end of each vane and its vane slot in the rotor provides an alternately expanding and contracting undervane chamber 58 associated with each vane. Those undervane chambers whose vane is riding over one of the inlet ramps 36 will be increasing in size and those whose vane is traveling over one of the discharge ramps 38 will be decreasing in size. The undervane chambers communicate with the pressure chamber 32 through a plurality of undervane balancing ports 60, 62, 64, and 66. Undervane balancing ports 60 and 64 communicate with the expanding undervane chambers and ports 62 and 66 communicate with the contracting undervane chambers. Two ports 68, each of which is the mirror image of one of the ports 60 or 64, are machined in the face 26 of body 10. Each of the undervane ports 60, 62, 64, and 66 performs the function of maintaining an outward biasing pressure on the under side of each vane thus maintaining the tip in contact with the cam ring 16. Ports 60 and 64 each perform an additional function in separate branches of the delivery conduit as will be hereinafter described.

An external delivery connection port 70 is provided in a boss 72 on the body member 10. Port 70 communicates with a drilled passage 74 which extends into body 10. The contracting intervane working chambers discharge high pressure fluid into pressure chamber 32 through the discharge ports 54 and passages 56, and also through discharge ports 52 directly. Pressure chamber 32 communicates with passage 74 and the delivery port 70 through delivery conduit means which may be considered as having two main parallel branches each having interposed in series therein the expanding undervane chambers. As heretofore noted, each of the undervane ports 60 and 64 conducts fluid to the expanding undervane chambers. Each of those ports communicates through those expanding chambers with its mirrored port 68 in body 10. A drilled hole 76 extends from each of the ports 68 to communicate with one of the upwardly extending passages 78 which communicate with the passage 74. Each of the passages 78 has a constriction 80 therein. The ports 60 and 64 each have a restrictive effect which becomes increasingly significant with increasing pump speed.

Four supplemental delivery paths are provided in the form of restricted drilled passages 82, a pair of which extend directly from the pocket ports 54 in body 10 into each of the vertical drilled passages 78. Each pair of supplemental passages 82 is in parallel with that portion of one of the main branches which includes either port 60 or 64, the expanding undervane chambers 58, one of the ports 68, and one of the passages 76. In other words, pressure fluid can pass from the pressure chamber 32 into either of the passages 78 through any of three parallel branches, comprising two of the holes 82 and a path through expanding undervane chambers, having a common juncture in one of the passages 78.

There is provided in head 14 a valve bore 84 which receives a flow control valve 86. A spring 88 biases valve 86 to the position illustrated wherein the valve nose abuts the pressure plate 30. Valve 86 includes a land 90 which, in the spring biased position illustrated, blocks communication between the chamber 32 and the transverse by-pass and return passage 46. A restrictive drilled passage 91 extends from passage 74 to communicate with a passage 92 which in turn communicates with a passage 94 leading to a spring chamber 96 associated with the valve 86. It will be seen that equal and opposed areas of valve 86 are respectively exposed to pressures in pressure chamber 32 and spring chamber 96. Since the pressure chamber 32 communicates with the passage 74 through the various branches of the delivery passage, the pressure drop across those branches will be effective on equal and opposed areas of the flow control valve 86.

Referring now to the schematic diagram of Figure 3, wherein a work load is indicated at 98 and a reservoir at 99, the flow path through the pump may be clearly seen. Load 98 may be a steering booster having valving of the restricted open center type. Contracting intervane working chambers discharge fluid into various branches of the delivery passages and into the pressure chamber 32. Some of the discharged fluid will pass directly into the vertical passages 78 through the by-pass holes 82. The balance of the fluid passing to the work, will pass through the ports 60 and 64, the expanding undervane chambers 58, and the drilled passages 76 to the vertical passages 78. Fluid delivered into each of the passages 78 will pass over one of the restrictions 80 and into the passage 74, passing from there to the outlet connection port 70. As heretofore noted, the pressure in chamber 32 is imposed on one end to the flow control valve 86 and pressure in the delivery conduit down stream of the parallel branches is imposed on the opposite end of valve 86.

In slow speed pump operation, the entire quantity of fluid pumped will pass to the external delivery connection port 70 some passing through the by-pass passages 82 directly into the vertical passages 78, and some passing through the balancing ports 60 and 64, the expanding undervane chambers 58, and passages 76. During such slow speed operation, the spring 88 will maintain the flow control valve 86 in the closed position, wherein the pressure chamber 32 is isolated from the by-pass and return passage 46. As the speed of the pumping mechanism is increased, the discharge rate will also increase. A point will be reached at which the flow rate through the branched delivery conduit produces a pressure drop which, reacting across valve spool 86, will overcome spring 88 thus shifting valve 86 to its cracking position, wherein initial communication is established between the pressure chamber 32 and the by-pass passage 46.

In the conventional system, the metered flow rate continues to increase, to some extent, with increasing pump speed. This is due to the rate of the valve biasing spring and the velocity effect of the by-passed fluid on the inner end of the spool. The metered-flow curve of such conventional system is shown by the dotted curve of Figure 4. The continuously increasing metered volume has a most adverse effect on nicety of steering control and on efficiency and cooling in the high speed ranges. In my hereinfore identified application, an invention is disclosed the practice of which provides a flow-versus-speed curve having a characteristic such as that illustrated by the dot-dash curve of Figure 4. By varying the circuit parameters of my earlier invention, it was possible to vary the characteristic of this curve, however, it was sometimes difficult to obtain a particular characteristic in one part of the curve without adversely affecting another part. Practice of the present invention enables the attainment of curves such as that indicated by the solid line in Figure 4. Note that the flow rate declines more gradually and does not have the abrupt, high-speed fall-off shown by the dot-dash curve of Figure 4.

The drooping curve is made possible by the provision of the delivery conduit branches which include therein the expanding undervane working chambers. It will be seen that the fluid which is withdrawn from those branches by the expanding undervane chambers will produce across the restriction of ports 60 and 64 a component of the total pressure drop acting on valve 86. The magnitude of this component of the pressure drop will be dependent solely on pump speed and not on the rate of fluid flow to the work load. The restrictive effect of ports 60 and 64 is very small at low speeds. However, as the pump speed increases, more and more fluid is withdrawn from the delivery conduit by the expanding undervane chambers and the restrictive effect of ports 60 and 64 becomes highly significant. Since the pressure differential imposed on valve 86 is produced by the total pressure drop through the branched delivery conduit between pressure chamber 32 and passage 74, the introduction of a pressure drop in that path having a component which is responsive to the pump speed and not to metered flow rate enables by-passing of increased quantities of fluid without increase in metered flow rate. In fact, as can be seen from Figure 4, in the higher speed ranges metered flow decreases as pump speed increases. This is due to the increasing significance of the restrictive effect of ports 60 and 64 in the higher speed range.

The pressure differential which controls valve 86 is thus a continuous function of the pressure drop due to flow to the work through the branched delivery conduit and the speed responsive pressure drop due to that flow through ports 60 and 64 used for filling the expanding undervane chambers.

The improved characteristic of the flow versus speed curve obtained by practice of the present invention is believed to be attributable to the different location of the by-pass passages 82 as compared to the location of the by-pass passage 88 in the disclosure of my hereinbefore identified application. According to the present invention, the by-pass passages 82 intersect branches of the discharge passages at points upstream of the main metering orifices 80. Thus, in the higher speed ranges, when the rate of fluid subtraction by the expanding undervane chambers becomes extremely high, those chambers may be supplementally fed by a portion of fluid which passes through the by-pass passages 82 into the vertical passages 78. Vane collapse is thus avoided, as is an undesirably high pressure drop through the undervane ports 60 and 64.

The present invention has provided a fluid pump and flow control unit for supplying a desired flow rate to a work load at varying pump speeds. The control is responsive to both flow rate to the load and to pump speed. Speed responsiveness has been obtained without undue complication of the pumping structure and without appreciably increasing the cost. A desirable flow-rate versus pump-speed curve characteristic is easily obtainable.

While the form of embodiment of the invention as herein disclosed constitutes a preferred form, it is to be understood that other forms might be adopted, all coming within the scope of the claims which follow.

What is claimed is as follows:

1. A fluid flow control system for delivering a controlled flow rate to a load from pumping mechanism driven at variable speed, comprising: delivery conduit means connecting the pump and the load valve means to divert fluid from said conduit; first and second flow restrictive means in said conduit; means for withdrawing fluid from said conduit at a rate proportional to pump speed at a point between said first and second restrictive means; a flow restrictive by-pass passage interconnecting the pump and said delivery conduit at a point between said first and second restrictive means; and means for utilizing the pressure differential between a point upstream of said first restrictive means and a point downstream of said second restrictive means to control said valve.

2. A fluid flow control system for delivering a controlled flow rate to a load from pumping mechanism driven at variable speed, comprising: delivery conduit means connecting the pump and the load; valve means spring biased to the closed position and shiftable to divert fluid from said conduit; first and second flow restrictive means in said conduit; means for withdrawing fluid from said conduit at a rate proportional to pump speed at a point between said first and second restrictive means; a flow restrictive by-pass passage interconnecting the pump and said delivery conduit at a point between said first and second restrictive means; and means for utilizing the pressure differential between a point upstream of said first restrictive means and a point downstream of said second restrictive means to shift said valve against said spring.

3. A fluid flow control system for delivering a controlled flow rate to a load from sliding vane type pumping mechanism driven at variable speed, comprising: alternately expanding and contracting undervane chambers associated with each vane; delivery conduit means connecting the pump and the load; valve means to divert fluid from said conduit; first and second flow restrictive means in said conduit; means including the expanding undervane chambers for withdrawing fluid from said conduit at a rate proportional to pump speed at a point between said first and second restrictive means; a flow restrictive by-pass passage interconnecting the pump and said delivery conduit at a point between said first and second restrictive means; and means for utilizing the pressure differential between a point upstream of said first restrictive means and a point downstream of said second restrictive means to control said valve.

4. A fluid flow control system for delivering a controlled flow rate to a load from sliding vane type pumping mechanism driven at variable speed, comprising: alternately expanding and contracting undervane chambers associated with each vane; delivery conduit means leading from the pump, said conduit including in series therein the expanding undervane chambers; valve means to divert fluid from said conduit; first flow restrictive means in said conduit upstream from said expanding chambers; second flow restrictive means in said conduit downstream from said expanding chambers; a flow restrictive by-pass passage interconnecting the pump and said delivery conduit at a point between said first and second restrictive means; and means for utilizing the pressure differential between a point upstream of said first restrictive means and a point downstream of said second restrictive means to control said valve.

5. A fluid flow control system for delivering a controlled flow rate to a load from pumping mechanism driven at variable speed, comprising: delivery conduit means leading from the pump having at least two parallel branches merging into a common branch and connecting the pump and the load; valve means to divert fluid from said delivery conduit; first flow restrictive means in one of said parallel branches; second flow restrictive means in the other of said branches; third flow restrictive means in said common branch; means for withdrawing fluid from said delivery conduit at a rate proportional to pump speed at a point downstream of said first and second restrictive means and upstream of said third restrictive means; and means for utilizing the pressure differential between a point upstream of all said restrictive means and a point downstream of all of said restrictive means to control said valve.

6. A fluid flow control system for delivering a controlled flow rate to a load from sliding vane type pumping mechanism driven at variable speed, comprising: alternately expanding and contracting undervane chambers associated with each vane; delivery conduit means leading from the pump having at least two parallel branches merging into a common branch and connecting the pump and the load; valve means to divert fluid from said delivery conduit; first flow restrictive means in one of said branches; second flow restrictive means in the other of said branches; third flow restrictive means in said common branch; means including the expanding undervane chambers for withdrawing fluid from said delivery conduit at a rate proportional to pump speed at a point downstream of said first and second restrictive means and upstream of said third restrictive means; and means for utilizing the pressure differential between a point upstream of all said restrictive means and a point downstream of all of said restrictive means to control said valve.

7. A fluid flow control system for delivering a controlled flow rate to a load from multi-throw sliding vane type pumping mechanism driven at variable speed, comprising: alternately expanding and contracting undervane chambers associated with each vane; branched delivery conduit means leading from the pump, each of said branches including in series therein the expanding undervane chambers associated with one of the throws; valve means to divert fluid from said conduit; first flow restrictive means in each of said branches upstream from said expanding chambers; second flow restrictive means in each of said branches downstream from said expanding chambers; a flow restrictive by-pass passage interconnecting the pump and each of said branches at a point between said first and second restrictive means; and means for utilizing the pressure differential between a point upstream of said first restrictive means and a point downstream of said second restrictive means to control said valve.

References Cited in the file of this patent

UNITED STATES PATENTS

| | | |
|---|---|---|
| 2,584,426 | Crane | Feb. 5, 1952 |
| 2,625,108 | Logan | Jan. 13, 1953 |
| 2,696,787 | Jaworowski | Dec. 14, 1954 |
| 2,731,919 | Prendergast | Jan. 24, 1956 |